(12) United States Patent
Held et al.

(10) Patent No.: US 11,435,120 B2
(45) Date of Patent: Sep. 6, 2022

(54) SPLIT EXPANSION HEAT PUMP CYCLE

(71) Applicant: ECHOGEN POWER SYSTEMS, LLC, Akron, OH (US)

(72) Inventors: Timothy J. Held, Akron, OH (US); Jason D. Miller, Hudson, OH (US)

(73) Assignee: ECHOGEN POWER SYSTEMS (DELAWARE), INC., Akron, OH (US)

( * ) Notice: Subject to any disclaimer, the term of this patent is extended or adjusted under 35 U.S.C. 154(b) by 147 days.

(21) Appl. No.: 16/867,447

(22) Filed: May 5, 2020

(65) Prior Publication Data

US 2021/0348806 A1  Nov. 11, 2021

(51) Int. Cl.
*F25B 30/02* (2006.01)
*F25B 30/06* (2006.01)

(52) U.S. Cl.
CPC .............. *F25B 30/06* (2013.01); *F25B 30/02* (2013.01)

(58) Field of Classification Search
CPC .... F25B 30/06; F25B 30/02; F25B 2309/061; F25B 2339/047; F25B 5/04; F25B 6/04; F25B 40/00; F25B 41/385; F25B 11/02; F25B 9/008
USPC ....................................................... 62/238.7
See application file for complete search history.

(56) References Cited

U.S. PATENT DOCUMENTS

| | | |
|---|---|---|
| 1,433,883 A | 10/1922 | Friderich |
| 1,969,526 A | 2/1934 | Rosch |
| 2,575,478 A | 11/1951 | Wilson |
| 2,634,375 A | 4/1953 | Guimbal |
| 2,691,280 A | 10/1954 | Albert |
| 3,095,274 A | 6/1963 | Crawford |
| 3,105,748 A | 10/1963 | Stahl |
| 3,118,277 A | 1/1964 | Wormser |
| 3,237,403 A | 3/1966 | Feher |
| 3,277,955 A | 10/1966 | Heller |
| 3,310,954 A | 3/1967 | Sijtstra et al. |
| 3,401,277 A | 9/1968 | Larson |
| 3,620,584 A | 11/1971 | Rosensweig |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |

(Continued)

FOREIGN PATENT DOCUMENTS

| | | |
|---|---|---|
| CA | 2794150 A1 | 11/2011 |
| CN | 1165238 A | 11/1997 |

(Continued)

OTHER PUBLICATIONS

Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.

(Continued)

*Primary Examiner* — Ana M Vazquez
(74) *Attorney, Agent, or Firm* — Nolte Lackenbach Siegel

(57) ABSTRACT

The disclosure provides a heat pump cycle that allows for an improved matching of the T(Q) slopes of the heat pump cycle. More particularly, the high temperature heat exchange is separated into two stages. Furthermore, a portion of the working fluid that was cooled in the first stage, is further cooled by expansion before being mixed with a heated working fluid for input to the recuperating heat exchanger.

20 Claims, 6 Drawing Sheets

(56) References Cited

U.S. PATENT DOCUMENTS

| | | |
|---|---|---|
| 3,791,137 A | 2/1974 | Jubb |
| 3,828,610 A | 8/1974 | Swearingen |
| 3,830,062 A | 8/1974 | Morgan et al. |
| 3,831,381 A | 8/1974 | Swearingen |
| 3,939,328 A | 2/1976 | Davis |
| 3,971,211 A | 7/1976 | Wethe |
| 3,977,197 A | 8/1976 | Brantley, Jr. |
| 3,982,379 A | 9/1976 | Gilli |
| 3,986,359 A | 10/1976 | Manning et al. |
| 3,991,588 A | 11/1976 | Laskaris |
| 3,998,058 A | 12/1976 | Park |
| 4,003,786 A | 1/1977 | Cahn |
| 4,005,580 A | 2/1977 | Swearingen |
| 4,009,575 A | 3/1977 | Hartman, Jr. |
| 4,015,962 A | 4/1977 | Tompkins |
| 4,029,255 A | 6/1977 | Heiser |
| 4,030,312 A | 6/1977 | Wallin |
| 4,037,413 A | 7/1977 | Heller et al. |
| 4,049,407 A | 9/1977 | Bottum |
| 4,070,870 A | 1/1978 | Bahel |
| 4,071,897 A | 1/1978 | Groves, Jr. et al. |
| 4,089,744 A | 5/1978 | Cahn |
| 4,099,381 A | 7/1978 | Rappoport |
| 4,110,987 A | 9/1978 | Cahn et al. |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,178,762 A | 12/1979 | Binstock et al. |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes |
| 4,221,185 A | 9/1980 | Scholes |
| 4,233,085 A | 11/1980 | Roderick |
| 4,236,869 A | 12/1980 | Laurello |
| 4,245,476 A | 1/1981 | Shaw |
| 4,248,049 A | 2/1981 | Briley |
| 4,257,232 A | 3/1981 | Bell |
| 4,276,747 A * | 7/1981 | Faldella .................. F01K 25/06 60/618 |
| 4,285,203 A | 8/1981 | Vakil |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,364,239 A | 12/1982 | Chappelle et al. |
| 4,372,125 A | 2/1983 | Dickenson |
| 4,374,467 A | 2/1983 | Briley |
| 4,384,568 A | 5/1983 | Palmatier |
| 4,390,082 A | 6/1983 | Swearingen |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,445,180 A | 4/1984 | Davis |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,471,622 A | 9/1984 | Kuwahara |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,507,936 A | 4/1985 | Yoshino |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,665,975 A | 5/1987 | Johnston |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford et al. |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,884,942 A | 12/1989 | Pennink |
| 4,888,954 A | 12/1989 | Silvestri, Jr. |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,080,047 A | 1/1992 | Williams et al. |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,245,836 A | 9/1993 | Lorentzen et al. |
| 5,248,239 A | 9/1993 | Andrews |
| 5,291,509 A | 3/1994 | Mizoguchi et al. |
| 5,291,960 A | 3/1994 | Brandenburg |
| 5,320,482 A | 6/1994 | Palmer et al. |
| 5,321,944 A | 6/1994 | Bronicki et al. |
| 5,335,510 A | 8/1994 | Rockenfeller |
| 5,358,378 A | 10/1994 | Holscher |
| 5,360,057 A | 11/1994 | Rockenfeller |
| 5,384,489 A | 1/1995 | Bellac |
| 5,392,606 A | 2/1995 | Labinov |
| 5,440,882 A | 8/1995 | Kalina |
| 5,444,972 A | 8/1995 | Moore |
| 5,483,797 A | 1/1996 | Rigal et al. |
| 5,487,822 A | 1/1996 | Demaray et al. |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,544,479 A | 8/1996 | Yan et al. |
| 5,570,578 A | 11/1996 | Saujet |
| 5,588,298 A | 12/1996 | Kalina |
| 5,600,967 A | 2/1997 | Meckler |
| 5,609,465 A | 3/1997 | Batson et al. |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,685,152 A | 11/1997 | Sterling |
| 5,704,206 A | 1/1998 | Kaneko et al. |
| 5,738,164 A | 4/1998 | Hildebrand |
| 5,754,613 A | 5/1998 | Hashiguchi |
| 5,771,700 A | 6/1998 | Cochran |
| 5,782,081 A | 7/1998 | Pak et al. |
| 5,789,822 A | 8/1998 | Calistrat |
| 5,799,490 A | 9/1998 | Bronicki et al. |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,884,470 A | 3/1999 | Frutschi |

(56) References Cited

U.S. PATENT DOCUMENTS

| | | |
|---|---|---|
| 5,894,836 A | 4/1999 | Wu |
| 5,899,067 A | 5/1999 | Hageman |
| 5,901,783 A | 5/1999 | Dobak, III et al. |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,954,342 A | 9/1999 | Mikhalev et al. |
| 5,973,050 A | 10/1999 | Johnson |
| 6,037,683 A | 3/2000 | Lulay |
| 6,041,604 A | 3/2000 | Nicodemus |
| 6,058,695 A | 5/2000 | Ranasinghe |
| 6,058,930 A | 5/2000 | Shingleton |
| 6,059,450 A | 5/2000 | McClure |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,233,955 B1 | 5/2001 | Egara |
| 6,282,900 B1 | 9/2001 | Bell |
| 6,282,917 B1 | 9/2001 | Mongan |
| 6,295,818 B1 | 10/2001 | Ansley |
| 6,298,653 B1 | 10/2001 | Lawlor |
| 6,299,690 B1 | 10/2001 | Mongeon |
| 6,341,781 B1 | 1/2002 | Matz |
| 6,347,520 B1 | 2/2002 | Ranasinghe et al. |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,490,812 B1 | 12/2002 | Bennett et al. |
| 6,530,224 B1 | 3/2003 | Conchieri |
| 6,539,720 B2 | 4/2003 | Rouse et al. |
| 6,539,728 B2 | 4/2003 | Korin |
| 6,563,855 B1 | 5/2003 | Nishi et al. |
| 6,571,548 B1 | 6/2003 | Bronicki |
| 6,581,384 B1 | 6/2003 | Benson |
| 6,588,499 B1 | 7/2003 | Fahlsing |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan et al. |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,892,522 B2 | 5/2005 | Brasz et al. |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,962,056 B2 | 11/2005 | Brasz et al. |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,553 B2 | 4/2006 | Johnston |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,343,746 B2 | 3/2008 | Pierson |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,673,681 B2 | 3/2010 | Vinegar et al. |
| 7,685,820 B2 | 3/2010 | Litwin et al. |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,971,424 B2 | 7/2011 | Masada |
| 7,972,529 B2 | 7/2011 | Machado |
| 7,997,076 B2 | 8/2011 | Ernst |
| 7,997,077 B2 * | 8/2011 | Corley ............ F01K 25/08 60/618 |
| 8,015,790 B2 | 9/2011 | Zhang et al. |
| 8,096,128 B2 | 1/2012 | Held et al. |
| 8,099,198 B2 | 1/2012 | Gurin |
| 8,099,972 B2 | 1/2012 | Dupraz |
| 8,146,360 B2 | 4/2012 | Myers |
| 8,235,647 B2 | 8/2012 | Pisseloup et al. |
| 8,281,593 B2 | 10/2012 | Held |
| 8,289,710 B2 | 10/2012 | Spearing et al. |
| 8,297,065 B2 | 10/2012 | Vaisman et al. |
| 8,375,719 B2 | 2/2013 | Rhodes et al. |
| 8,387,248 B2 | 3/2013 | Rolt et al. |
| 8,419,936 B2 | 4/2013 | Berger et al. |

(56) References Cited

U.S. PATENT DOCUMENTS

| | | |
|---|---|---|
| 8,544,274 B2 | 10/2013 | Ernst |
| 8,584,463 B2 | 11/2013 | Hemrle et al. |
| 8,613,195 B2 | 12/2013 | Held et al. |
| 8,661,820 B2 | 3/2014 | Mak |
| 8,813,497 B2 | 8/2014 | Hart et al. |
| 8,820,083 B2 | 9/2014 | Davidson et al. |
| 8,869,531 B2 | 10/2014 | Held |
| 8,973,398 B2 | 3/2015 | Coyle |
| 9,038,390 B1 | 5/2015 | Kreuger |
| 9,180,421 B2 | 11/2015 | Kwang et al. |
| 9,523,312 B2 | 12/2016 | Allam et al. |
| 9,638,065 B2 | 5/2017 | Vermeersch et al. |
| 9,810,451 B2 | 11/2017 | O'Donnell et al. |
| 9,845,667 B2 | 12/2017 | Mokheimer et al. |
| 9,874,112 B2 | 1/2018 | Giegel |
| 9,932,861 B2 | 4/2018 | Preuss et al. |
| 10,077,683 B2 | 9/2018 | Close |
| 10,472,994 B2 * | 11/2019 | Avadhanula ............ F01K 25/10 |
| 2001/0015061 A1 | 8/2001 | Viteri et al. |
| 2001/0020444 A1 | 9/2001 | Johnston |
| 2001/0027642 A1 | 10/2001 | Tsuji |
| 2001/0030952 A1 | 10/2001 | Roy |
| 2002/0029558 A1 | 3/2002 | Tamaro |
| 2002/0053196 A1 | 5/2002 | Lerner et al. |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2002/0148225 A1 | 10/2002 | Lewis |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2004/0247211 A1 | 12/2004 | Hamke |
| 2005/0022963 A1 | 2/2005 | Garrabrant et al. |
| 2005/0056001 A1 | 3/2005 | Frutschi |
| 2005/0072182 A1 | 4/2005 | Taniguchi et al. |
| 2005/0096676 A1 | 5/2005 | Gifford, III et al. |
| 2005/0109387 A1 | 5/2005 | Marshall |
| 2005/0118025 A1 | 6/2005 | Hiegemann et al. |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2005/0262848 A1 | 12/2005 | Joshi et al. |
| 2005/0276685 A1 | 12/2005 | Wiggins et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0112702 A1 | 6/2006 | Martin et al. |
| 2006/0137387 A1 * | 6/2006 | Aflekt ................ F25B 9/008 62/513 |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0222523 A1 | 10/2006 | Valentian et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0007771 A1 | 1/2007 | Biddle et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0116299 A1 | 10/2007 | Energies |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0134681 A1 | 6/2008 | Nayef et al. |
| 2008/0135253 A1 | 6/2008 | Vinegar et al. |
| 2008/0163618 A1 | 7/2008 | Paul |
| 2008/0163625 A1 | 7/2008 | O'Brien |
| 2008/0173444 A1 | 7/2008 | Stone et al. |
| 2008/0173450 A1 | 7/2008 | Goldberg et al. |
| 2008/0174115 A1 | 7/2008 | Lambirth |
| 2008/0211230 A1 | 9/2008 | Gurin |
| 2008/0217321 A1 | 9/2008 | Vinegar et al. |
| 2008/0250789 A1 | 10/2008 | Myers et al. |
| 2008/0252078 A1 | 10/2008 | Myers |
| 2008/0282702 A1 | 11/2008 | Collins |
| 2008/0282715 A1 | 11/2008 | Aue et al. |
| 2009/0021251 A1 | 1/2009 | Simon |
| 2009/0071156 A1 | 3/2009 | Nishikawa et al. |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0179429 A1 | 7/2009 | Ellis et al. |
| 2009/0180903 A1 | 7/2009 | Martin et al. |
| 2009/0205892 A1 | 8/2009 | Jensen et al. |
| 2009/0211251 A1 | 8/2009 | Peterson et al. |
| 2009/0211253 A1 | 8/2009 | Radcliff et al. |
| 2009/0257902 A1 | 10/2009 | Ernens |
| 2009/0266075 A1 | 10/2009 | Westmeier et al. |
| 2009/0293503 A1 | 12/2009 | Vandor |
| 2009/0320477 A1 | 12/2009 | Juchymenko |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0143094 A1 | 6/2010 | Pisseloup et al. |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0212316 A1 | 8/2010 | Waterstripe et al. |
| 2010/0218513 A1 | 9/2010 | Vaisman et al. |
| 2010/0218930 A1 | 9/2010 | Proeschel |
| 2010/0263380 A1 | 10/2010 | Biederman et al. |

(56) References Cited

U.S. PATENT DOCUMENTS

| | | |
|---|---|---|
| 2010/0287920 A1 | 11/2010 | Duparchy |
| 2010/0287934 A1 | 11/2010 | Glynn et al. |
| 2010/0300093 A1 | 12/2010 | Doty |
| 2010/0319346 A1 | 12/2010 | Ast et al. |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0051880 A1 | 3/2011 | Al-Mayahi et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0100002 A1 | 5/2011 | Muir et al. |
| 2011/0100611 A1 | 5/2011 | Ohler et al. |
| 2011/0113781 A1 | 5/2011 | Frey et al. |
| 2011/0164957 A1 | 7/2011 | Rivas et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopecek et al. |
| 2011/0214424 A1 | 9/2011 | Wood |
| 2011/0219760 A1 | 9/2011 | McBride et al. |
| 2011/0259010 A1 | 10/2011 | Bronicki et al. |
| 2011/0270451 A1 | 11/2011 | Sakaguchi et al. |
| 2011/0286724 A1 | 11/2011 | Goodman |
| 2011/0288688 A1 | 11/2011 | Lehan |
| 2011/0299972 A1 | 12/2011 | Morris |
| 2011/0308253 A1 | 12/2011 | Ritter |
| 2012/0042650 A1 | 2/2012 | Ernst et al. |
| 2012/0027688 A1 | 3/2012 | Yin et al. |
| 2012/0047892 A1 | 3/2012 | Held et al. |
| 2012/0055153 A1 | 3/2012 | Murata et al. |
| 2012/0067046 A1 | 3/2012 | Drenik et al. |
| 2012/0067055 A1 | 3/2012 | Held |
| 2012/0047889 A1 | 4/2012 | Yarpour |
| 2012/0111003 A1 | 5/2012 | Kasuya et al. |
| 2012/0125002 A1 | 5/2012 | Lehar et al. |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0167873 A1 | 7/2012 | Venetos et al. |
| 2012/0174558 A1 | 7/2012 | Gurin |
| 2012/0186219 A1 | 7/2012 | Gurin |
| 2012/0240616 A1 | 9/2012 | Ritter et al. |
| 2012/0247134 A1 | 10/2012 | Gurin |
| 2012/0247455 A1 | 10/2012 | Gurin et al. |
| 2012/0255304 A1 | 10/2012 | Li et al. |
| 2012/0261090 A1 | 10/2012 | Durmaz et al. |
| 2012/0261104 A1 | 10/2012 | Kelly et al. |
| 2012/0306206 A1 | 12/2012 | Agrawal et al. |
| 2012/0319410 A1 | 12/2012 | Ambrosek et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0074497 A1 | 3/2013 | Mori et al. |
| 2013/0087301 A1 | 4/2013 | Hemrle et al. |
| 2013/0113221 A1 | 5/2013 | Held |
| 2013/0134720 A1 | 5/2013 | Fukasaku et al. |
| 2013/0145759 A1 | 6/2013 | Sonwane et al. |
| 2014/0041387 A1 | 2/2014 | Benson |
| 2014/0090405 A1 | 4/2014 | Held et al. |
| 2014/0102098 A1 | 4/2014 | Bowan et al. |
| 2014/0102103 A1 | 4/2014 | Yamamoto et al. |
| 2014/0150992 A1 | 6/2014 | Koontz et al. |
| 2014/0208750 A1 | 7/2014 | Vermeersch |
| 2014/0208751 A1 | 7/2014 | Bowan |
| 2014/0216034 A1 | 8/2014 | Numata et al. |
| 2014/0223907 A1 | 8/2014 | Fujioka et al. |
| 2014/0224447 A1 | 8/2014 | Reznik et al. |
| 2014/0260404 A1 | 9/2014 | Verma et al. |
| 2015/0069758 A1 | 3/2015 | Davidson et al. |
| 2015/0369086 A1 | 12/2015 | Johnson et al. |
| 2016/0017759 A1 | 1/2016 | Gayawal et al. |
| 2016/0040557 A1 | 2/2016 | Vermeersch et al. |
| 2016/0102608 A1 | 4/2016 | Lynn |
| 2016/0237904 A1 | 8/2016 | Scarboro et al. |
| 2017/0058202 A1 | 3/2017 | Noureldin et al. |
| 2017/0350658 A1 | 12/2017 | Kerth et al. |
| 2017/0362963 A1 | 12/2017 | Hostler et al. |
| 2018/0187628 A1 | 7/2018 | Apte |
| 2018/0340712 A1 | 11/2018 | Peter et al. |
| 2019/0170026 A1 | 6/2019 | Matsukuma et al. |
| 2020/0003081 A1 | 1/2020 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1997 |
| DE | 19906087 A1 | 8/2000 |
| DE | 10052993 A1 | 5/2002 |
| DE | 10336624 A1 | 3/2004 |
| DE | 102007020086 B3 | 4/2007 |
| DE | 10 2011005722 B3 | 3/2011 |
| EP | 0003980 A1 | 2/1979 |
| EP | 0286565 A2 | 4/1988 |
| EP | 1484489 A2 | 8/2004 |
| EP | 1577549 A1 | 9/2005 |
| EP | 1977174 A2 | 10/2008 |
| EP | 1998013 A2 | 12/2008 |
| EP | 2157317 A2 | 2/2010 |
| EP | 2241737 A1 | 10/2010 |
| EP | 2312129 A1 | 4/2011 |
| EP | 2357324 A2 | 9/2011 |
| EP | 2390473 A1 | 11/2011 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 A1 | 1/2013 |
| EP | 2698506 A1 | 2/2014 |
| GB | 856985 A | 12/1960 |
| GB | 2010974 A | 7/1979 |
| GB | 2075608 A | 11/1981 |
| JP | 58-193051 A | 11/1983 |
| JP | 60-040707 A | 3/1985 |
| JP | 61-152914 A | 7/1986 |
| JP | 01-240705 A | 9/1989 |
| JP | H03182638 A | 8/1991 |
| JP | 05-321612 A | 12/1993 |
| JP | 06-331225 A | 11/1994 |
| JP | 08-028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11-270352 | 5/1999 |
| JP | 2000-257407 A | 9/2000 |
| JP | 3119718 B2 | 12/2000 |
| JP | 2001-193419 A | 7/2001 |
| JP | 2002-097965 A | 4/2002 |
| JP | 2003-529715 A | 10/2003 |
| JP | 2004-239250 A | 8/2004 |
| JP | 2004-332626 A | 11/2004 |
| JP | 2005-030727 A | 2/2005 |
| JP | 2005-533972 A | 11/2005 |
| JP | 2005-533972 A1 | 11/2005 |
| JP | 2006-037760 A | 2/2006 |
| JP | 2006-177266 A | 7/2006 |
| JP | 2007-198200 A | 9/2007 |
| JP | 4343738 B2 | 10/2009 |
| JP | 2011-017268 A | 1/2011 |
| KR | 100191080 | 6/1999 |
| KR | 10_2007_0086244 A | 8/2007 |
| KR | 10-0766101 B1 | 10/2007 |
| KR | 10-0844634 A | 7/2008 |
| KR | 10-20100067927 A | 6/2010 |

(56) References Cited

FOREIGN PATENT DOCUMENTS

| | | |
|---|---|---|
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 11/2012 |
| KR | 2012-0128755 A | 11/2012 |
| KR | 10-1866116 B1 | 7/2018 |
| WO | WO 1991/05145 A1 | 4/1991 |
| WO | WO 92/12366 A1 | 7/1992 |
| WO | WO 1996/009500 A1 | 3/1996 |
| WO | WO 00-71944 A1 | 11/2000 |
| WO | WO 2001/044658 A1 | 6/2001 |
| WO | WO 02/090721 A1 | 11/2002 |
| WO | WO 02/090747 A2 | 11/2002 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |
| WO | WO 2007/082103 A2 | 7/2007 |
| WO | WO 2007/112090 A2 | 10/2007 |
| WO | WO 2008014774 A2 | 2/2008 |
| WO | WO 2008/039725 A2 | 4/2008 |
| WO | WO 2008/101711 A2 | 8/2008 |
| WO | WO 2009/045196 A1 | 4/2009 |
| WO | WO 2009/058992 A2 | 5/2009 |
| WO | WO 2010/006942 A1 | 2/2010 |
| WO | WO 2010/017981 A2 | 2/2010 |
| WO | WO 2010/017981 A3 | 2/2010 |
| WO | WO 2010/074173 A1 | 7/2010 |
| WO | WO 2010/083198 A1 | 7/2010 |
| WO | WO 2010/121255 A1 | 10/2010 |
| WO | WO 2010/126980 A2 | 11/2010 |
| WO | WO 2010/151560 A1 | 12/2010 |
| WO | WO 2011/017450 A2 | 2/2011 |
| WO | WO 2011/017476 A1 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | WO 2012/036678 A1 | 3/2012 |
| WO | WO 2012/074905 A2 | 6/2012 |
| WO | WO 2012/074907 A2 | 6/2012 |
| WO | WO 2012/074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |
| WO | WO 2014/164620 A1 | 3/2014 |
| WO | WO 2014/114531 A1 | 7/2014 |
| WO | WO 2014/138035 A1 | 9/2014 |
| WO | WO 2014/159520 A1 | 10/2014 |
| WO | WO 2016/150455 A1 | 9/2016 |
| WO | WO 2018/217969 A1 | 11/2018 |
| WO | WO 2020/90721 A1 | 7/2020 |

OTHER PUBLICATIONS

Angeling, G., and Invernizzi, C.M., "Carbon Dioxide Power Cycles using Liquid Natural Gas as Heat Sink", Applied Thermal Engineering Mar. 3, 2009, 43 pages.
Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.
Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.
Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.
Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.
Chen, Yang, "Thermodynamic Cycles Using Carbon Dioxide as Working Fluid", Doctoral Thesis, School of Industrial Engineering and Management, Stockholm, Oct. 2011, 150 pages., (3 parts).
Chinese Search Report for Application No. 201080035382.1, 2 pages.
Chinese Search Report for Application No. 201080050795.7, 2 pages.
Chordia, Lalit, "Optimizing Equipment for Supercritical Applications", Thar Energy LLC, Supercritical CO2 Power Cycle Symposium, May 24-25, 2011, Boulder, CO, 7 pages.
Colegrove, et al., "Structured Steam Turbines for the Combined-Cycle Market", GE Power Systems, GER-4201, May 2001, 18 pages.
Combs, Osie V., "An Investigation of the Supercritical CO2 Cycle (Feher cycle) for Shipboard Application", Massachusetts Institute of Technology, May 1977, 290 pages.
Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.
Dostal, V., et al., A Supercritical Carbon Dioxide Cycle for Next Generation Nuclear Reactors, Mar. 10, 2004, 326 pages., (7 parts).
Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.
Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.
Ebenezer, Salako A.; "Removal of Carbon Dioxide from Natural Gas for LNG Production", Institute of Petroleum Technology Norwegian University of Science and Technology, Dec. 2005, Trondheim, Norway, 74 pages.
Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.
Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.
Feher, E.G., et al., "Investigation of Supercritical (Feher) Cycle", Astropower Laboratory, Missile & Space Systems Division, Oct. 1968, 152 pages.
Fuller, Robert L., and Eisemann, Kevin, "Centrifugal Compressor Off-Design Performance for Super-Critical CO2" , Barber Nichols, Inc. Presentation, Supercritical CO2 Power Cycle Symposium, May 24-25, 2011, Boulder, CO, 20 pages.
Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.
Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.
Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.
Gowrishankar, K., "Adaptive Fuzzy Controller to Control Turbine Speed", Rajiv Gandhi College of Engg. & tech., Puducherry, India, 7 pages.
Hjartarson, Heimir; "Waste Heat Utilization at Elkem Ferrosilicon Plant in Iceland", University of Iceland, 2009, 102 pages.

(56) References Cited

OTHER PUBLICATIONS

Hjartarson, et al.; "Waste Heat Utilization from a Submerged ARC Furnace Producing Ferrosilicon", The Twelfth International Ferroalloys Congress Sustainable Future; , Helsinki, Finland Jun. 6-9, 2010, 10 pages.
Hejzlar, P. et al., "Assessment of Gas Cooled Gas Reactor with Indirect Supercritical CO2 Cycle" Massachusetts Institute of Technology, Jan. 2006, 10 pages.
Hoffman, John R., and Feher, E.G., "150 kwe Supercritical Closed Cycle System", Transactions of the ASME, Jan. 1971, pp. 70-80.
Jeong, Woo Seok, et al., "Performance of S-CO2 Brayton Cycle with Additive Gases for SFR Application", Korea Advanced Institute of Science and Technology, Supercritical CO2 Power Cycle Symposium, May 24-25, 2011, Boulder, CO, 5 pages.
Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.
Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).
Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.
Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.
Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.
Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.
Mohamed, Omar, et al., "Modelling Study of Supercritical Power Plant and Parameter Identified Using Genetic Algorithms", Proceedings of the World Congress on Engineering 2010 vol. II, WCE 2010, Jun. 30-Jul. 2, 2010, London, U.K., 6 pages.
Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.
Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.
Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.
Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Muto, Yasushi, and Kato, Yasuyoshi, "Optimal Cycle Scheme of Direct Cycle Supercritical CO2 Gas Turbine for Nuclear Power Generation Systems", International Conference on Power Engineering-2007, Oct. 23-27, 2007, Hangzhou, China, pp. 86-87.
Noriega, Bahamonde J.S., "Design Method for s-CO2 Gas Turbine Power Plants", Master of Science Thesis, Delft University of Technology, Oct. 2012, 122 pages., (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2011/029486—International Preliminary Report on Patentability dated Sep. 25, 2012, 6 pages.
PCT/US2011/029486—International Search Report and Written Opinion dated Nov. 16, 2011, 9 pages.
PCT/US2010/049042—International Search Report and Written Opinion dated Nov. 17, 2010, 11 pages.
PCT/US2010/049042—International Preliminary Report on Patentability dated Mar. 29, 2012, 18 pages.
PCT/US2010/031614—International Search Report dated Jul. 12, 2010, 3 pages.
PCT/US2010/031614—International Preliminary Report on Patentability dated Oct. 27, 2011, 9 pages.
PCT/US2010/039559—International Preliminary Report on Patentability dated Jan. 12, 2012, 7 pages.
PCT/US2010/039559—Notification of Transmittal of the International Search Report and Written Opinion of the International Searching Authority, or the Declaration dated Sep. 1, 2010, 6 pages.
PCT/US2010/044681—International Search Report and Written Opinion dated Oct. 7, 2010, 10 pages.
PCT/US2010/044681—International Preliminary Report on Patentability dated Feb. 16, 2012, 9 pages.
PCT/US2010/044476—International Search Report dated Sep. 29, 2010, 23 pages.
PCT/US2007/001120—International Search Report dated Apr. 25, 2008, 7 pages.
PCT/US2006/049623—Written Opinion of ISA dated Jan. 4, 2008, 4 pages.
PCT/US2007/079318—International Preliminary Report on Patentability dated Jul. 7, 2008, 5 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/023026—Notification of Transmittal of the International Search Report and the Written Opinion of the International Searching Authority, or the Declaration dated Jul. 22, 2014, 11 pages.
PCT/US2014/013170—Notification of Transmittal of the International Search Report and the Written Opinion of the International Searching Authority, or the Declaration dated May 9, 2014, 12 pages.
PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062198—Extended European Search Report dated May 6, 2014, 9 pages.

(56) References Cited

OTHER PUBLICATIONS

PCT/US2011/062201—International Search Report and Written Opinion dated Jun. 26, 2012, 9 pages.
PCT/US2011/062201—Extended European Search Report dated May 28, 2014, 8 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2014/013154—International Search Report dated May 23, 2014, 4 pages.
PCT/US2014/024548—International Search Report and Written Opinion dated Sep. 5, 2014, 11 pages.
PCT/US2013/064475—International Search Report and Written Opinion dated Jan. 16, 2014, 11 pages.
PCT/US2014/024254—International Search Report and Written Opinion dated Aug. 13, 2014, 10 pages.
PCT/US2014/026173—Notification of Transmittal of the International Search Report and the Written Opinion of the International Searching Authority, or the Declaration dated Jul. 9, 2014, 10 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
PCT/US2014/024305—Notification of Transmittal of the International Search Report and the Written Opinion of the International Searching Authority, or the Declaration dated Aug. 26, 2014, 11 pages.
PCT/US2014/023990—Notification of Transmittal of the International Search Report and the Written Opinion of the International Searching Authority, or the Declaration dated Jul. 17, 2014, 10 pages.
PCT/US2015/57701—Notification of Transmittal of the International Search Report and the Written Opinion of the International Searching Authority, or the Declaration dated Dec. 22, 2015, 11 pages.
PCT/US2015/57756—Notification of Transmittal of the International Search Report and the Written Opinion of the International Searching Authority, or the Declaration dated July 27, 2017, 41 pages.
PCT/US2014/020242—Notification of Transmittal of the International Search Report and the Written Opinion of the International Searching Authority, or the Declaration dated Aug. 5, 2014, 9 pages.
PCT/US2018/034289—Notification of Transmittal of the International Search Report and the Written Opinion of the International Searching Authority, or the Declaration dated Oct. 2, 2018, 22 pages.
"Steam Turbines", PDHengineer.com Course No. M-3006.
Steam Turbines (Energy Engineering) http://what-when-how.com/energy-engineering/steam-turbines-energy-engineering/, Oct. 25, 2012, 14 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.

Pruess, Karsten, "Enhanced Geothermal Systems [EGS]: Comparing Water and CO2 as Heat Transmission Fluids", Proceedings, New Zealand Geothermal Workshop 2007 Auckland, New Zealand, Nov. 19-21, 2007, 13 pages.
Pruess, Karsten, "Enhanced Geothermal Systems [EGS]: Using CO2 as Working Fluid—A Novel Approach for Generating Renewable Energy with Simultaneous Sequestration of Carbon", Submitted to Geothermics, Jun. 2006, 26 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-Up Response of Fluid Film Lubricated Cryogenic Turbopumps [Preprint]", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S-CO2 Power Cycle with Reheating" Energy Conversion and Management 50 (May 17, 2009), pp. 1939-1945.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.
Tom, Samsun Kwok Sun, "The Feasibility of Using Supercritical Carbon Dioxide as a Coolant for the Candu Reactor", The University of British Columbia, Jan. 1978, 156 pages.
"Two-flow rotors"; http://www.answers.com/topic/steam-turbine#ixzz2AJsKAwHX.
VGB PowerTech Service GmbH, "CO2 Capture and Storage", A VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.
Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.
Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.

\* cited by examiner

SPLIT EXPANSION HEAT PUMP CYCLE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This section introduces information from the art that may be related to or provide context for some aspects of the technique described herein and/or claimed below. This information is background information facilitating a better understanding of that which is disclosed herein. This is a discussion of "related" art. That such art is related in no way implies that it is also "prior" art. The related art may or may not be prior art. The discussion is to be read in this light, and not as admissions of prior art.

Referring to FIG. 1, in a conventional heat pump cycle, the working fluid is compressed from a relatively low temperature, low pressure state (State 2) to one of higher temperature and pressure (State 3). This heat can then be transferred to a heat transfer target HTR that receives and either uses or stores that heat. In FIG. 1, the heat transfer target HTR starts at the conditions of HTRc and is stored at HTRh. During the process of heating the material that comprises the HTR from HTRc to HTRh, the working fluid is cooled to State 4.

The process of transferring heat from the working fluid to the HTR takes place in a counter-flow heat exchanger. This process of heat transfer can be depicted on a "TQ" (temperature-heat flow) graph or diagram such as the one shown in FIG. 2. The illustrated example uses supercritical Carbon dioxide ("$sCO_2$") at 30 MPa pressure as the working fluid, and silica sand as the HTR medium.

SUMMARY

In some embodiments, a heat pump includes a heat transfer source, a heat transfer target; and a closed fluid loop to circulate a working fluid. The closed fluid loop further includes a compression device, a counterflow heat exchanger, a low temperature expansion device, a low temperature heat exchanger, a high temperature expansion device, and a recuperating heat exchanger. Each of these elements of the closed fluid loop operate on the working fluid within the closed fluid loop.

More particularly, in operation, the compression device receives the working fluid in a first state and raises the temperature and pressure of the working fluid through mechanical work to place the working fluid in a second state. The counterflow heat exchanger includes a first stage and a second stage. The first stage is in thermal communication with the heat transfer target and receives the working fluid from the compression device in the second state and transfers heat from the received working fluid to the heat transfer target to cool the working fluid to a third state. The second stage is in thermal communication with the heat transfer target and receives a first portion of the working fluid in the third state from the first stage and transfers heat from the received first portion of the working fluid in the third state to the heat transfer target to cool the working fluid to a fourth state.

The low temperature expansion device, in operation, receives the working fluid in a fifth state to expand the working fluid to a sixth state. The low temperature heat exchanger is in thermal communication with the heat transfer source and receives the working fluid in the sixth state and transfers the heat from the heat transfer source to the working fluid in the sixth state to heat the working fluid to a seventh state. The high temperature expansion device receives a second portion of the working fluid in the third state from the first stage of the counterflow heat exchanger and expand the received second portion of the working fluid to an eighth state. The recuperating heat exchanger transfers heat from the working fluid in the fourth state received from the second stage of the counterflow heat exchange to a combination of the working fluid in the seventh state received from the high temperature expansion device and the working fluid in the eighth state received from the low temperature heat exchanger, thereby heating the mixed working fluid to the first state and cooling the working fluid in the fourth state to the fifth state.

In other examples a heat pump includes: a heat transfer target; a heat transfer source; and a closed fluid loop to circulate a working fluid. The closed fluid loop includes: a compression device, means for performing a split expansion of the working fluid, a low temperature heat exchanger, and a recuperating heat exchanger. The compression device receives the working fluid in a first state and heats and pressurizes the received working fluid to a second state. The means for performing the split expansion of the working fluid in the second state expands a first portion of the working fluid in a partially cooled third state to an eighth state and expands a second portion of the working fluid in the partially cooled third state to a sixth state after the second portion of the working fluid in the third state is further cooled to a twice-cooled fourth state and still further cooled to a fifth state. The low temperature heat exchanger is in thermal communication with the heat transfer source and receives the working fluid in the sixth state and transfer heat from the heat transfer source to the working fluid in the sixth state to heat the working fluid to a seventh state. The recuperating heat exchanger transfers heat from the working fluid in the fourth state received from the second stage of the counterflow heat exchanger to a combination of the working fluid in the seventh state received from the high temperature expansion device and the working fluid in the eighth state received from the low temperature heat exchanger, thereby heating the mixed working fluid to the first state and cooling the working fluid in the fourth state to the fifth state.

In still other embodiments, this disclosure describes a method for operating a heat pump in a closed fluid loop, comprising: compressing a working fluid in a first state to raise the temperature and pressure to a second state; and cooling the working fluid in the second state in a counterflow heat exchanger. The cooling in the counterflow heat exchanger includes: cooling the working fluid in the second state in a first stage to a third state; and cooling a first portion of the working fluid in the third state in a second stage to a fourth state. The method further includes expanding the working fluid in a fifth state to a sixth state; heating the working fluid in the sixth state to a seventh state; expanding a second portion of the working fluid in the third state to an eight state; mixing the working fluid in the seventh state with the working fluid in the eighth state; and heating the mixture of the working fluid in the seventh and eighth states to the first state while cooling the working fluid in the fourth state to the fifth state in a recuperating heat exchanger.

The above presents a simplified summary in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The subject matter disclosed below may be understood by reference to the following description taken in conjunction with the accompanying drawings, in which like reference numerals identify like elements, and in which.

While the disclosed technique is susceptible to various modifications and alternative forms, the drawings illustrate specific embodiments herein described in detail by way of example. It should be understood, however, that the description herein of specific embodiments is not intended to limit that which is claimed to the particular forms disclosed, but on the contrary, the intention is to cover all modifications, equivalents, and alternatives falling within the spirit and scope of the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
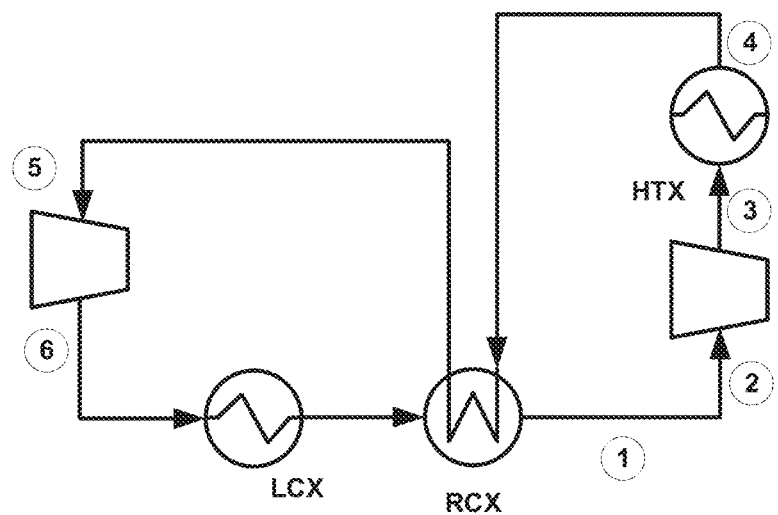
FIG. 1 is a schematic diagram of a conventional heat pump employing a conventional heat pump cycle.
Figure 2:
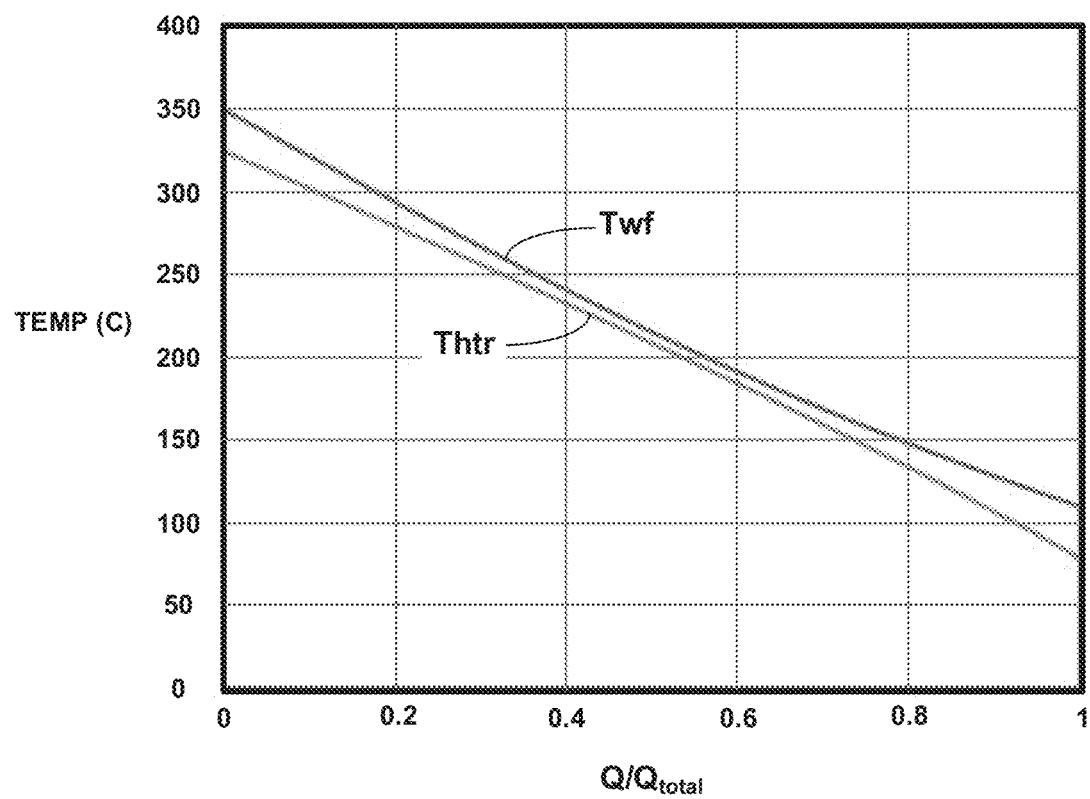
FIG. 2 is a T(Q) plot for the counterflow heat exchanger of the heat pump cycle of FIG. 1.
Figure 3:
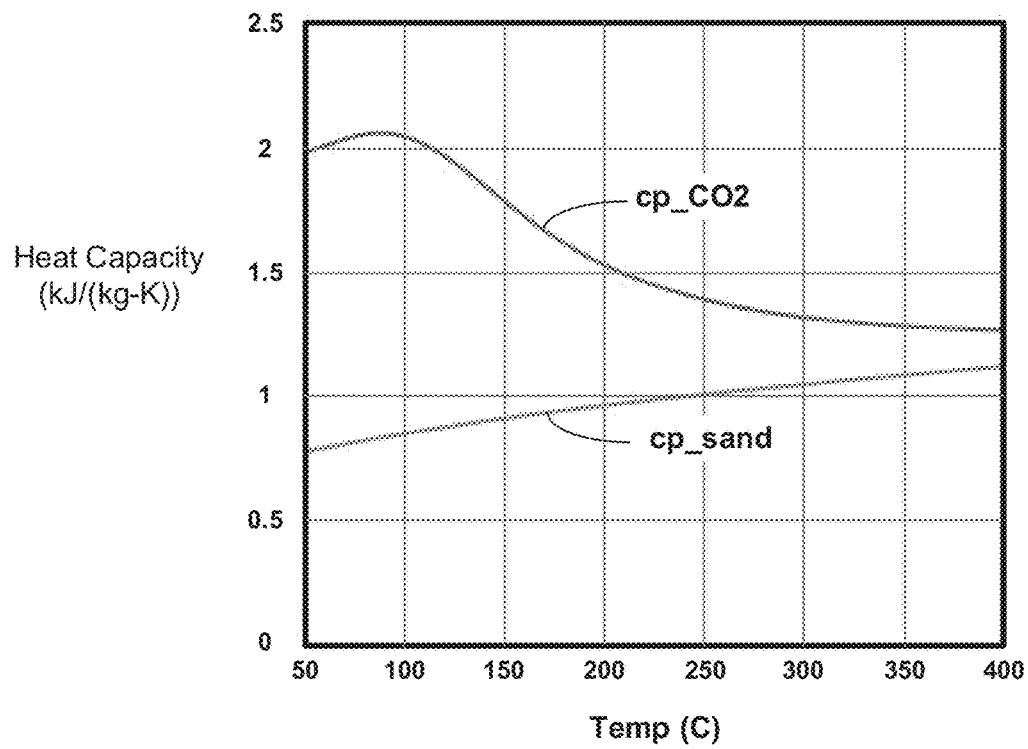
FIG. 3 is a plot of heat capacity vs. temperature for the heat pump cycle of FIG. 1 illustrating changes in heat capacity of the working fluid and the heat transfer medium as their temperature varies.

Referring again to the conventional heat pump cycle discussed above relative to FIG. 1 and FIG. 2, the slopes of the Twf and Thtr curves in the TQ plot are determined by the flow rate and heat capacity ("cp") of the fluids. Both of these fluids exhibit significant changes in heat capacity as their respective temperature varies through the heat exchanger as shown in FIG. 3. This variation can be seen in FIG. 3 as curvature in the T(Q) plots. Because the heat capacity curves are mismatched, the amount of heat that can be transferred from the working fluid to the HTR medium is limited.

Figure 4:
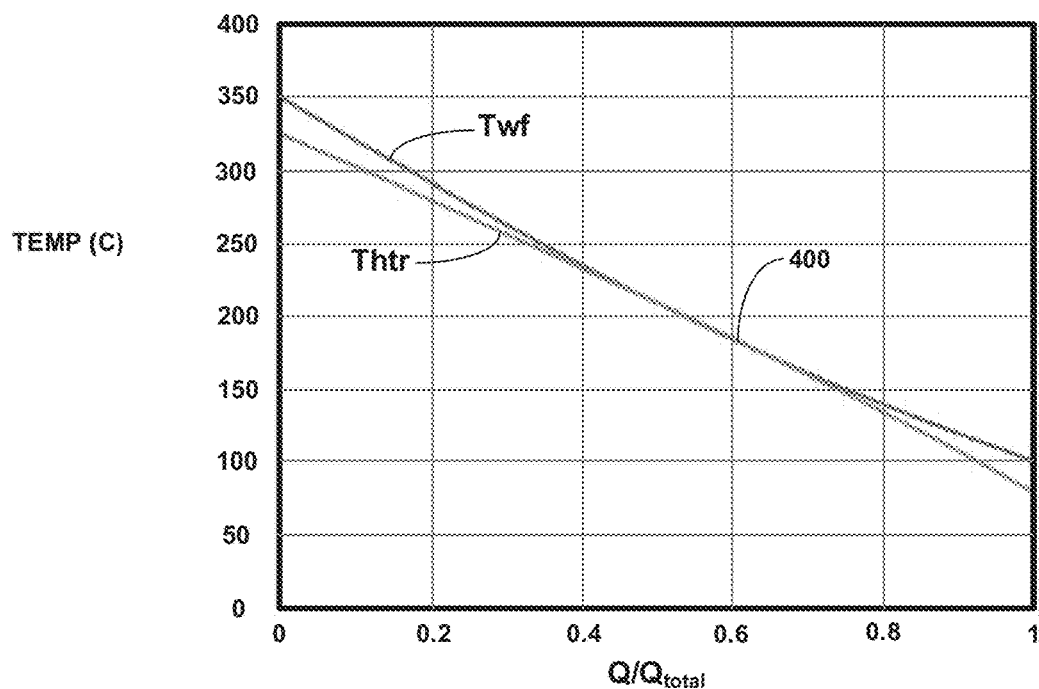
FIG. 4 is a second T(Q) plot for the counterflow heat exchanger of the heat pump cycle of FIG. 1 illustrating how, as the working fluid flow rate increases relative to the heat transfer medium flow rate, the rate of change in the working fluid temperature will increase until it reaches a point at which further increases in working fluid flow rate cannot decrease the working fluid exit temperature.

As the working fluid flow rate decreases relative to the HTR medium flow rate, the slope of the Twf curve will decrease, until the T(Q) plots intersect at a point 400 as shown in FIG. 4. At this intersection point, further decreases in working fluid flow rate cannot decrease the working fluid exit temperature, as the heat transfer process cannot proceed any faster due to the near-zero temperature differential between the fluids at the point where the curves intersect. This phenomenon is frequently termed as "pinch", which in this case occurs in the middle of the heat exchanger.

As the heat pump performance will be impacted by this pinch phenomenon, it would be beneficial to match the slopes of the working fluid and HTR medium T(Q) plots. Because heat capacity is a thermodynamic property of the two materials, and thus cannot be varied, one can only change the T(Q) slope(s) by changing the flow rate of either or both materials. Also, the HTR medium flow rates may be difficult to control and storing more than the two heat transfer targets shown in FIG. 1 would be complex and cost-prohibitive.

The presently disclosed technique provides a heat pump cycle that allows for an improved matching of the T(Q) slopes and improves the performance of the heat pump cycle. More particularly, the high temperature heat exchange (e.g., as occurs in the counterflow heat exchanger HTX in FIG. 1) is instead separated into two stages. Furthermore, a portion of the working fluid that was cooled in the first stage, is further cooled by expansion before being mixed with a heated working fluid for input to the recuperating heat exchanger. Still other variations may be seen in still other embodiments.

Figure 5:
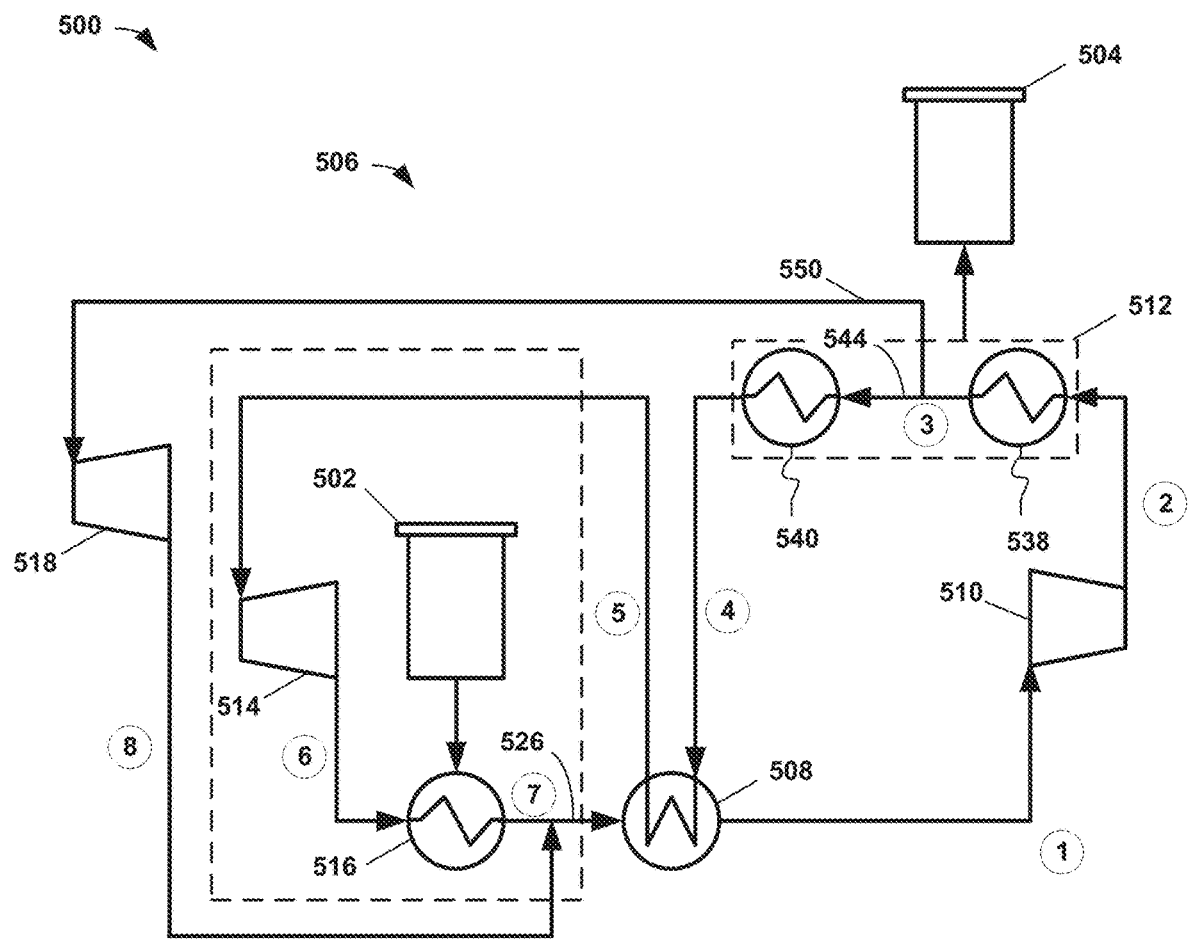
FIG. 5 is a schematic diagram of a split expansion heat pump employing a split expansion heat pump cycle in accordance with one or more embodiments of the subject matter claimed below.

FIG. 5 is a schematic diagram of a heat pump 500 employing a split expansion heat pump cycle in accordance with one or more embodiments. The heat pump 500 includes a heat transfer source 502, a heat transfer target 504, and a closed fluid loop 506. The closed fluid loop 506, in operation, circulates a working fluid that is used for heat transfer in a manner described further below. The working fluid may be, for example, Carbon dioxide. Depending on the point in the closed fluid loop 506 under discussion, the working fluid may be referred to as a "heated working fluid", a "compressed working fluid", a "cooled working fluid", etc. during the discussion of the operation of the closed fluid loop 506.

The heat transfer source 502 includes a heat transfer medium not otherwise shown. The heat transfer medium may have a variable heat capacity, although not all embodiments are so limited, and may be a fluid or a solid. If a fluid, the heat transfer medium may be, for example, a synthetic oil heat transfer fluid, water, or sand. The heat transfer source 502 may be, for example, a fluid circulating in a conduit depending on the embodiment. If the heat transfer medium is a solid, the solid may be, for example, a solid mass or a flowing sand contained in a reservoir.

The heat transfer target 504 includes a heat transfer medium not otherwise shown that may be a variable heat capacity material(s) although not all embodiments are so limited. The heat transfer medium may be a fluid or a solid. If a fluid, the heat transfer medium may be, for example, a synthetic oil heat transfer fluid, water, or sand. The fluid may be circulated in a conduit, for example. Thus, the heat transfer target 504 may be a fluid circulating in a conduit. If the heat transfer medium is a solid, the solid may be, for example, a solid mass or sand.

The closed fluid loop 506 of FIG. 5 is to circulate the working fluid and includes a recuperating heat exchanger 508, a compression device 510, a counterflow heat exchanger 512, a low temperature expansion device 514, a low temperature heat exchanger 516, and a high temperature expansion device 518. The compression device 510, in operation, receives the working fluid in a first state from the recuperating heat exchanger 508. The compression device 510 raises the temperature and pressure of the working fluid in the first state to a second state through mechanical work. The compression device 510, in operation, provides the motive force for circulating the working fluid through the closed fluid loop 506. Those in the art will readily appreciate that the compression device 510 may be a compressor and that the expansion devices 514, 518 may be expanders such as turbines, such devices are well known in the art.

The counterflow heat exchanger 512 includes a first stage 538 and a second stage 540, both of which are in thermal communication with the heat transfer target 504. The counterflow heat exchanger 512 may be implemented in various ways depending on the embodiment. For example, in some embodiments the counterflow heat exchanger 512 may be implemented in two single-stage heat exchangers, each single-stage heat exchanger implementing a respective one of the first stage 538 or second stage 540. In other embodiments, the counterflow heat exchanger 512 may be a single heat exchanger with an intermediate manifold. Those in the art having the benefit of this disclosure may appreciate still other variations on the implementation of the counterflow heat exchanger 512.

In operation, the first stage 538 of the counterflow heat exchanger 512 receives the working fluid in the second state and transfers heat therefrom to the heat transfer target 504 to cool the working fluid to a third state. The second stage 540 receives a first portion 544 of the working fluid in the third state and transfers heat therefrom to the heat transfer target 504 to cool the working fluid from the third state to a fourth state.

Note that there is an optimal flow split between the first portion 544 and the second portion 550 of the working fluid in the third state that maximizes the coefficient of performance ("COP") of the heat pump 500. This can be inferred from FIG. 8 relative to the heat pump cycle of FIG. 5. "Optimal" in this context refers to a maximum achievable heat pump performance as defined by the amount of net work required to transfer a given amount of heat to heat transfer target 504. The optimal flow split is a function of the thermodynamic characteristics (specifically, the heat capacity) of the working fluid and the heat transfer medium of the heat transfer target 504.

The low temperature expansion device 514, in operation, receives the working fluid in a fifth state from the recuperating heat exchanger 508. The low temperature expansion device 514 reduces the pressure and reduces the temperature of the working fluid in the first state to cool the working fluid to a sixth state. The low temperature expansion device 514 may be implemented in, for example, an expansion valve or a turbine.

The low temperature heat exchanger 516 is in thermal communication with the heat transfer source 502. In operation, the low temperature heat exchanger 516 receives the working fluid in the sixth state from the low temperature expansion device 514 and heats the working fluid to a seventh state.

The counterflow heat exchanger 512, low temperature expansion device 514, and high temperature expansion device 518, by way of example and illustration, form, in some embodiments, a means for performing a split expansion of the working fluid in the second state, the split expansion including expanding a first portion of the working fluid in a partially cooled third state to an eighth state and expanding a second portion of the working fluid in the partially cooled third state to a sixth state after the second portion of the working fluid in the third state is further cooled to fourth state and still further cooled to a fifth state. Other embodiments may include variations on the structure disclosed in FIG. 5. It is to be understood that such means may be implemented in structural equivalents that perform the recited function.

The high temperature expansion device 518 receives a second portion 550 of the working fluid in the third state. The high temperature expansion device 518 expands the second portion 550 of the working fluid in the third state to reduce its pressure and temperature to the eighth state. The high temperature expansion device 518 may be implemented in, for example, an expansion valve or a turbine.

Still referring to FIG. 5, the heat pump 500 transfers heat to the combination or mixture 526 of the working fluid in the seventh state and the working fluid in the eighth state from the working fluid in the fourth state. This returns the working fluid in the fourth state to the fifth state and the mixture 526 to the first state. The working fluid in the first state is then compressed to raise the temperature and pressure as described above.

More particularly, the recuperating heat exchanger 508, in operation, receives a twice-cooled working fluid in the fourth state from the counterflow heat exchanger 512 and a combination 526 of the working fluid in the seventh state from the low temperature heat exchanger 516 and the working fluid in the eighth state from the high temperature expansion device 518. Heat transfers in the recuperating heat exchanger 508 return the working fluid in the fourth state to the fifth state and places the mixture 526 in the first state.

The heat pump 500 implements a split expansion of the working fluid. As used herein, "split expansion" refers to the feature wherein a part of the working fluid is expanded after being partially cooled in the first stage heat exchange and the rest of the working fluid is expanded after being cooled in both the first and second stage heat exchanges. So, in FIG. 5, the first portion 544 and the second portion 550 are both expanded in such a split expansion. The first portion 544 is cooled in both the first stage 538 and the second stage 540 heat exchange and then expanded by the low temperature expansion device 514. The second portion 550 is only cooled in the first stage 538 of heat transfer before being expanded by the high temperature expansion device 518. Thus, the working fluid in the heat pump 500 undergoes a "split expansion".

Figure 6:
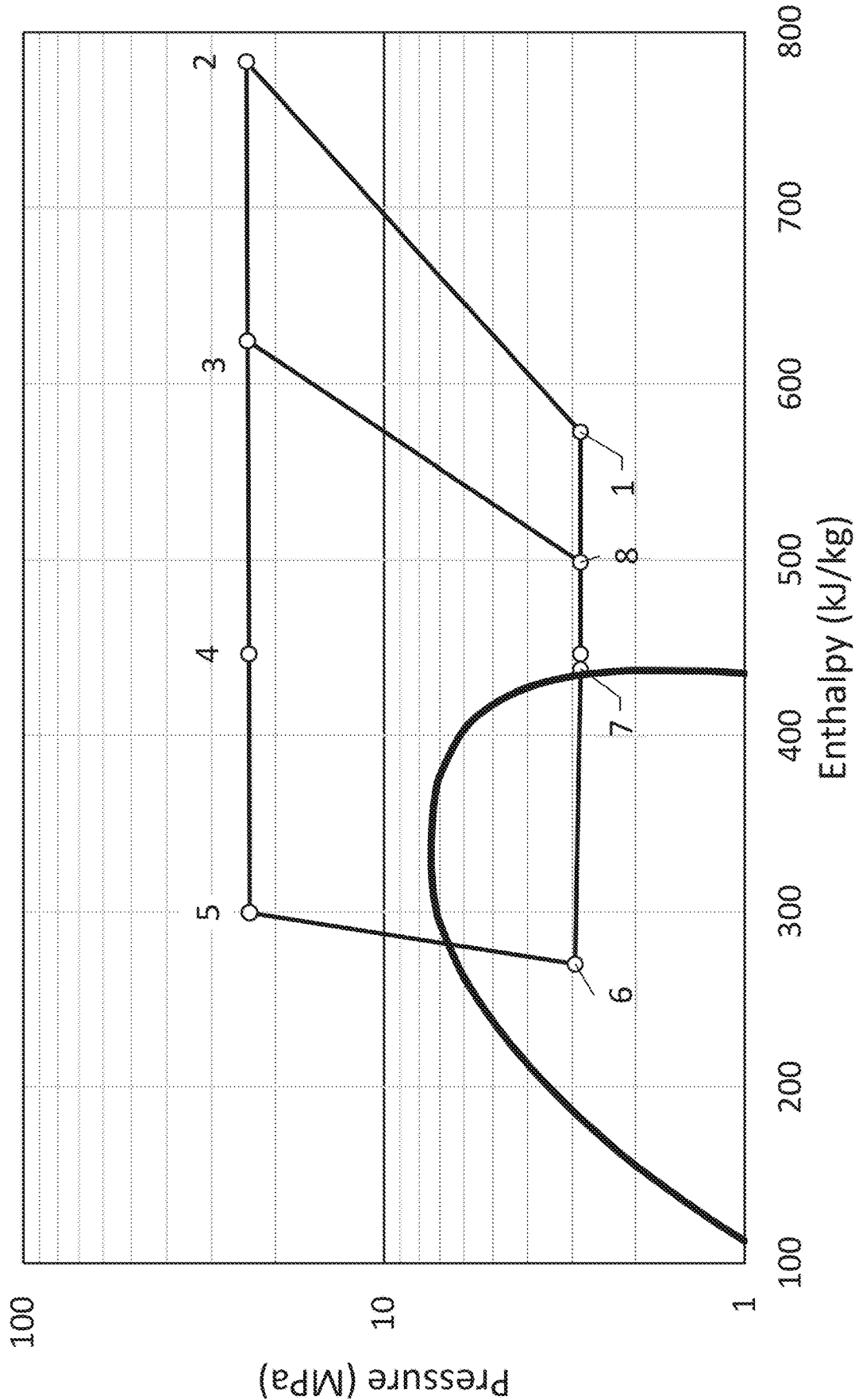
FIG. 6 is a pressure-enthalpy diagram for the working fluid at certain points in the heat pump cycle of FIG. 5 in one particular embodiment.

To further an understanding of the subject matter claimed below, one particular embodiment will now be disclosed. FIG. 6 is a pressure-enthalpy diagram for the working fluid at certain points in the heat pump cycle of the heat pump 500 in FIG. 5 in one particular embodiment. In this particular embodiment, the working fluid is Carbon dioxide ($CO_2$). The heat transfer medium of the heat transfer target 512 is sand.

The heat pump cycle 500, like the heat pump 500 of FIG. 5, divides the high temperature heat exchange into two stages 538, 540. In this particular embodiment, the two stages 538, 540 are implemented in two similarly sized stages. "Similarly sized" refers to the thermal conductance of the heat stages. Thermal conductance, generally termed "UA", is the product of the average heat transfer coefficient ("U") and heat transfer area ("A"). The relative sizes of the two stages 538, 540 in other embodiments may vary in size, one being larger than the other. The specific sizes of the stages 538, 540 may be selected during the design process dependent on the relative thermodynamic properties (e.g., heat capacity) of the working fluid and the heat transfer medium of the heat transfer targets 504.

The working fluid in the second state flows out of the compression device 510 and into the first-stage 538. In the first stage 538, the temperature of the working fluid in the second state decreases as the first stage 538 completes a heating of the heat transfer medium in the heat transfer target 504. A first portion 544 of the once-cooled working fluid 542 then proceeds to the second-stage 540 in the third.

The first portion 544 of the once-cooled working fluid in the third state is further cooled in the second stage 540 by the heat transfer medium of the heat transfer target 504 while the heat transfer medium is being heated. This first portion 544 of the working fluid in the third state is then cooled to the fourth state the twice-cooled working fluid 524 in the fourth state. The twice-cooled working fluid in the fourth state may still contain heat at a useful temperature that could be transferred back into the working fluid before the inlet 511 of the compressor 510 in another heater. This other heater is the recuperating heat exchanger 508.

The recuperated working fluid 532 is still at high pressure (i.e., state 5 in FIG. 6). The working fluid in the fifth state is then expanded through a low temperature expansion device 514, which can either be a valve or a low-temperature turbine ("LT Turbine"). This process greatly reduces the temperature of the working fluid in the fifth state, thereby creating the working fluid to the sixth state.

The temperature reduction in the low temperature expansion device 514 allows the working fluid in the second state to receive heat from the heat transfer source 502. The heat transfer medium of the heat transfer source 502 is a synthetic oil heat transfer fluid, water, or sand. At this point, the working fluid (i.e., $CO_2$) in the sixth state is either liquid or a liquid/vapor mixture. Heat is transferred to the working fluid in the low temperature heat exchanger 516. This heat transfer causes the working fluid to evaporate, thereby creating the working fluid in the seventh state. The working fluid in the seventh state is then mixed with the working fluid in the eighth state. The combination 526 of the working fluid in the seventh state and the working fluid in the eighth state is then further heated in the recuperating heat exchanger 508 to the first state before being compressed again.

The second portion 550 of the once-cooled working fluid in the third state is extracted between the first stage 538 and the second stage 540 and is expanded through the high temperature expansion device 518, which is a high temperature turbine in this embodiment. In the high temperature expansion device 518 the working fluid generates shaft work that can offset the work required to operate the charge compressor 510. The resultant working fluid in the eighth state then mixes back into the primary fluid stream downstream of the low temperature heat exchanger 516 and upstream of the recuperating heat exchanger 508 as shown in FIG. 5.

Figure 7:
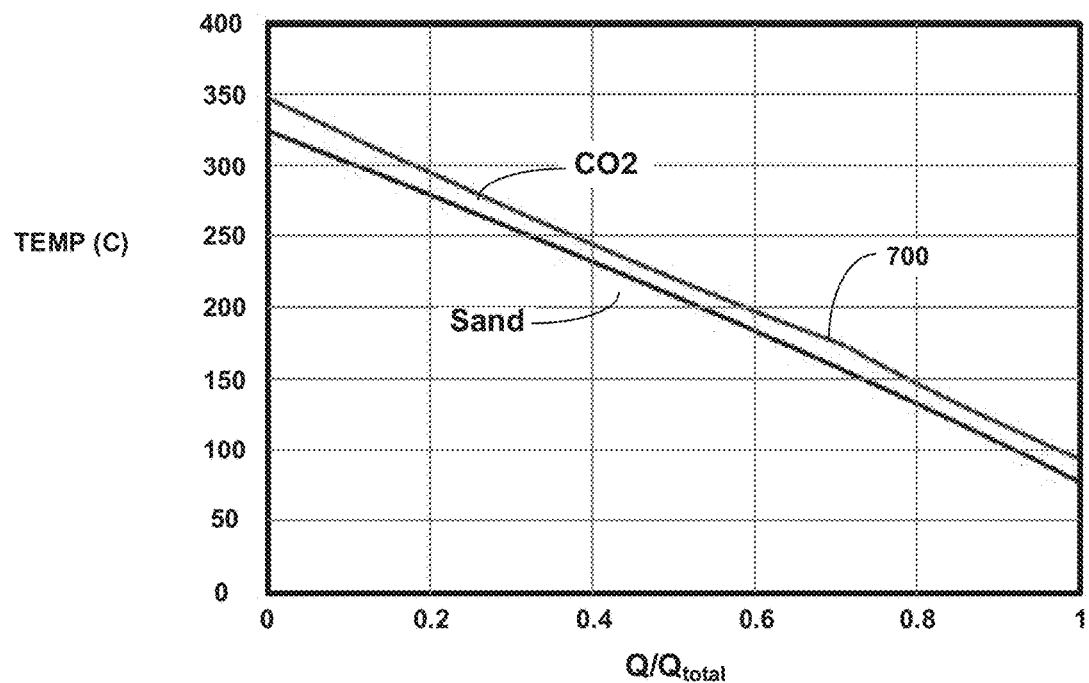
FIG. 7 is a T(Q) plot for the counterflow heat exchanger of the heat pump cycle of FIG. 5.
Figure 8:
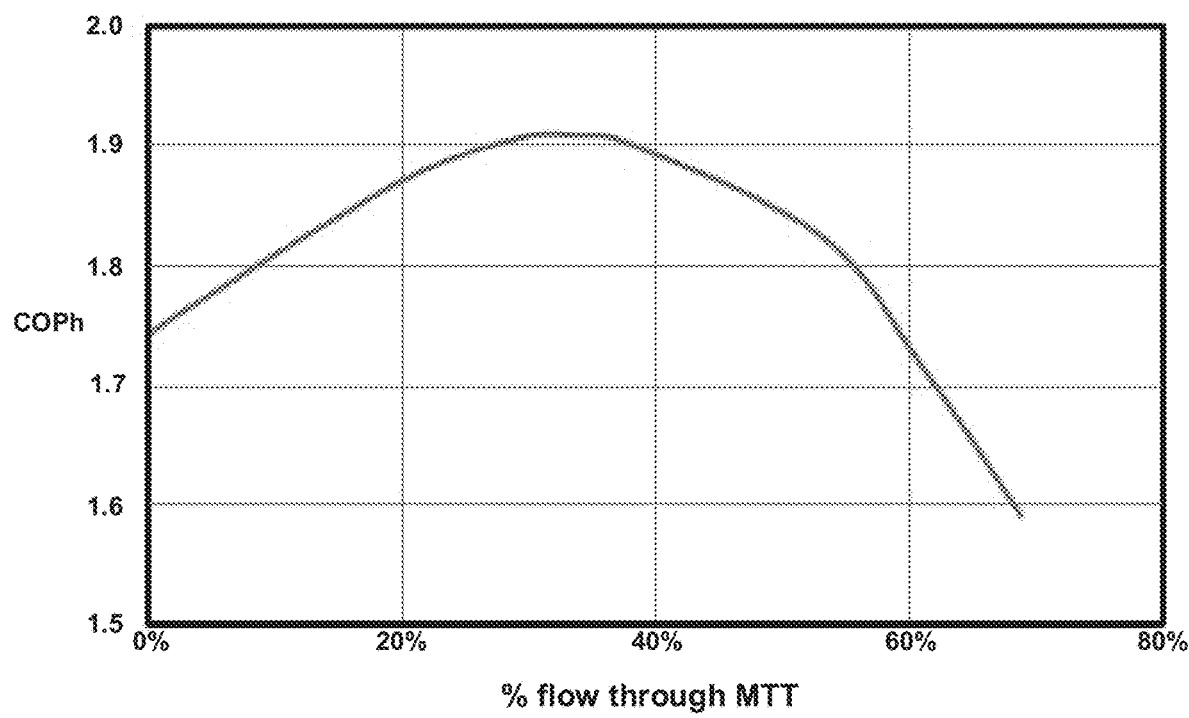
FIG. 8 is a graph of the coefficient of performance ("COP") of the heat pump cycle as a function of the portion of the flow extracted between first stage and the second stage of the counter-flow heat exchanger in the heat pump cycle in FIG. 5.

The T(Q) plot of the counterflow heat exchanger 512 in the heat pump cycle 500 is shown in FIG. 7. The change in slope at approximately 70% Q/Qtot is the point 700 where approximately 34% of the working fluid has been extracted between the first stage 538 and the second stage 540. The coefficient of performance ("COP") of the heat pump cycle for the heat pump 500 as a function of the portion of the flow extracted between the first stage 538 and the second stage 540 is shown in FIG. 8. For this set of conditions and assumptions, the improvement in COP is nearly 10%.

As noted above relative to the embodiment of FIG. 5, there is an "optimal" split in the proportions of the working fluid that are expanded. The proportions are set in such a manner is to approximately match the slope of the working fluid temperature curve to the heat transfer medium temperature curve as shown in FIG. 7. Recalling that the slope of these curves are inversely proportional to the product of fluid mass flow rate and fluid heat capacity (i.e., slope ~$1/(m \cdot c_p)$), one can calculate an approximate flow rate of the working fluid in each stage of the counterflow heat exchanger that would result in this slope matching.

Figure 9:
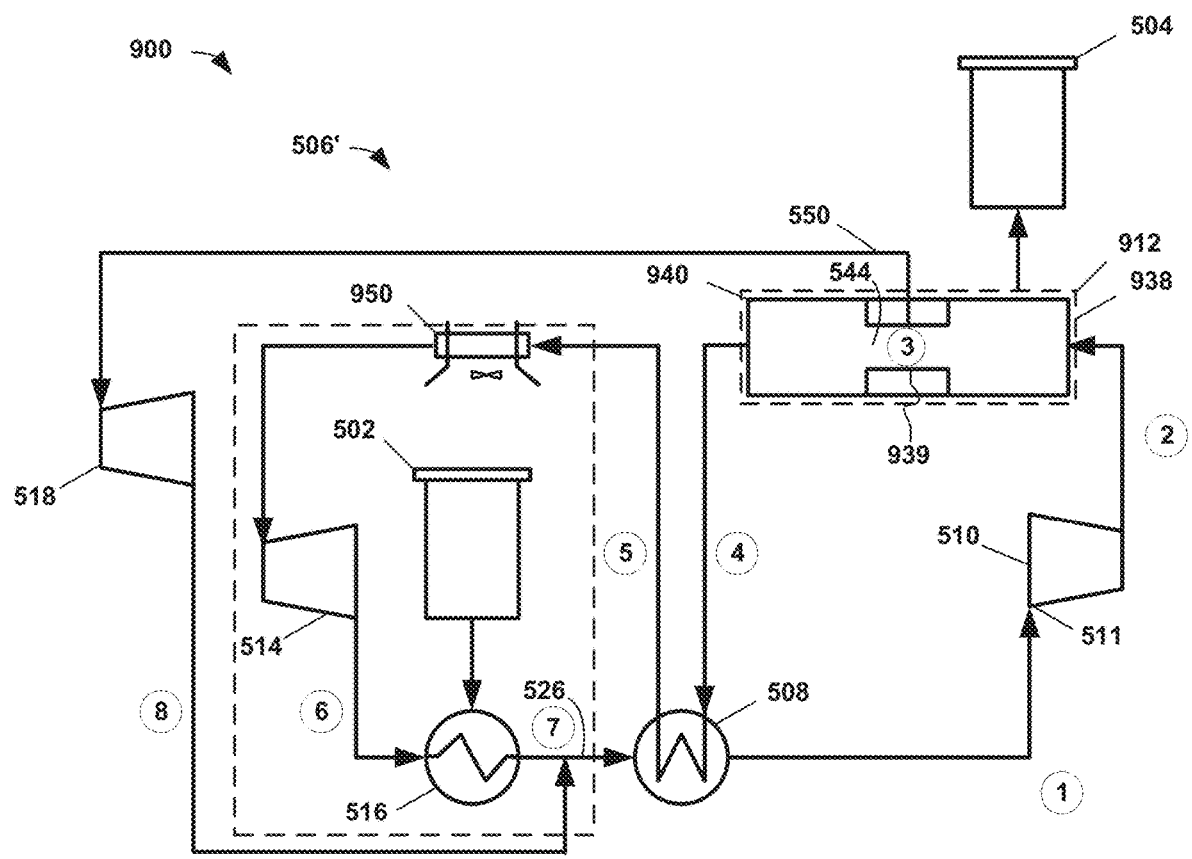
FIG. 9 is a schematic diagram of a second particular embodiment of the split expansion heat pump cycle of FIG. 5.

FIG. 9 is a schematic diagram of a heat pump 900 illustrating some variations that may be found in some embodiments. Some parts of the heat pump 900 are in common with the heat pump 500 of FIG. 5, and like parts bear like numbers. In one example variation the counterflow heat exchanger 912 is implemented in a single heat exchanger with an intermediate manifold 939 defining a first stage 938 and a second stage 940. The second portion 550 of the once-cooled working fluid 542 is drawn from the intermediate manifold 939. In a second example variation the heating side 922 includes an auxiliary heat exchanger 950 disposed between the recuperating heat exchanger 508 and the low pressure expansion device 514. The auxiliary heat exchanger 950 rejects heat from the second portion 546 of the recuperated working fluid 532 to the ambient environment before the second portion 546 is received by the low temperature expansion device 514. Those skilled in the art having the benefit of this disclosure may appreciate still further variations.

The disclosed heat pump cycle claimed below has applicability to any heat pump application where the heated fluid (e.g., the heat transfer medium) has a heat capacity vs. temperature curve that substantially differs from that of the working fluid (e.g., $CO_2$), which encompasses most practical fluids. For instance, the heat capacity of commercially available heat transfer fluids like DURATHERM HF™ or DOWTHERM™ follow a similar dependence on temperature as does sand (increasing $c_p$ with temperature).

This concludes the detailed description. The particular embodiments disclosed above are illustrative only, as the claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the claims. Accordingly, the protection sought herein is as set forth in the claims below.

What is claimed:
1. A heat pump, comprising:
   a heat transfer source;

a heat transfer target; and
a closed fluid loop to circulate a working fluid, the closed fluid loop including:
  a compression device to receive the working fluid in a first state and raise the temperature and pressure of the working fluid through mechanical work to place the working fluid in a second state;
  a counterflow heat exchanger, including:
    a first stage in thermal communication with the heat transfer target, the first stage to receive the working fluid in the second state and transfer heat from the received working fluid to the heat transfer target to cool the working fluid to a third state; and
    a second stage in thermal communication with the heat transfer target, the second stage to receive a first portion of the working fluid in the third state and transfer heat from the received first portion of the working fluid in the third state to the heat transfer target to cool the working fluid to a fourth state;
  a low temperature expansion device to receive the working fluid in a fifth state and expand the working fluid to a sixth state;
  a low temperature heat exchanger in thermal communication with the heat transfer source, the low temperature heat exchanger to receive the working fluid in the sixth state and transfer heat from the heat transfer source to the working fluid in the sixth state to heat the working fluid to a seventh state;
  a high temperature expansion device to receive a second portion of the working fluid in the third state and expand the received second portion of the working fluid in the third state to an eighth state; and
  a recuperating heat exchanger to transfer heat from the working fluid in the fourth state received from the second stage of the counterflow heat exchange to a combination of the working fluid in the seventh state received from the high temperature expansion device and the working fluid in the eighth state received from the low temperature heat exchanger, thereby heating the mixed working fluid to the first state and cooling the working fluid in the fourth state to the fifth state.

2. The heat pump of claim 1, wherein at least one of the high temperature expansion device and the low temperature expansion device comprises a turbine or a valve.

3. The heat pump of claim 1, wherein at least one of the heat transfer source and the heat transfer target includes a heat transfer medium including at least one of a fluid and a solid.

4. The heat pump of claim 3, wherein the fluid is flowing in a conduit.

5. The heat pump of claim 3, wherein the solid is a solid mass or sand.

6. The heat pump of claim 3, wherein the fluid is water, a water/propylene glycol mixture, or air.

7. The heat pump of claim 1, wherein the heat transfer medium is a synthetic oil heat transfer fluid, water, or sand.

8. The heat pump of claim 1, wherein the counterflow heat exchanger includes two single-stage heat exchangers or a single heat exchanger with an intermediate manifold.

9. The heat pump of claim 8, wherein the two single-stage heat exchangers are similarly sized.

10. The heat pump of claim 1, further comprising an auxiliary heat exchanger disposed between the recuperating heat exchanger and the low pressure expansion device, the auxiliary heat exchanger to reject heat from the second portion of the recuperated working fluid from the recuperating heat exchanger to the ambient environment before the second portion of the recuperated working fluid is received by the low temperature expansion device.

11. The heat pump of claim 1, wherein the working fluid is Carbon dioxide.

12. The heat pump of claim 1, wherein:
the compression device is a compressor;
the low temperature expansion device is a first expander; and
the high temperature expansion device is a second expander.

13. A heat pump, comprising:
a heat transfer target;
a heat transfer source; and
a closed fluid loop to circulate a working fluid, the closed fluid loop including:
  a compression device to receive the working fluid in a first state and heat and pressurize the received working fluid to a second state;
  means for performing a split expansion of the working fluid in the second state, the split expansion including expanding a first portion of the working fluid in a partially cooled third state to an eighth state and expanding a second portion of the working fluid in the partially cooled third state to a sixth state after the second portion of the working fluid in the third state is further cooled to fourth state and still further cooled to a fifth state;
  a low temperature heat exchanger in thermal communication with the heat transfer source to receive the working fluid in the sixth state and transfer heat from the heat transfer source to the working fluid in the sixth state to heat the working fluid to a seventh state;
  a recuperating heat exchanger to transfer heat from the working fluid in the fourth state received from the second stage of the counterflow heat exchanger to a combination of the working fluid in the seventh state received from the high temperature expansion device and the working fluid in the eighth state received from the low temperature heat exchanger, thereby heating the mixed working fluid to the first state and cooling the working fluid in the fourth state to the fifth state.

14. The heat pump of claim 13, wherein the means for performing the split expansion includes:
a counterflow heat exchanger, including:
  a first stage in thermal communication with the heat transfer target to receive the working fluid in the second state from the compression device and transfer heat from the received working fluid in the second state to the heat transfer target to cool the received working fluid in the second state to the partially cooled third state; and
  a second stage in thermal communication with the heat transfer target to receive the first portion of the working fluid in the partially cooled second state from the first stage and transfer heat from the working fluid in the partially cooled second state to the heat transfer target to cool the working fluid to the twice-cooled fourth state;
a low temperature expansion device to expand the working fluid in the fifth state received from the recuperating heat exchanger to the sixth state; and
a high temperature expansion device to receive the second portion of the working fluid in the third state from the first stage of the counterflow heat exchanger and expand the received second portion of the working fluid to the eighth state.

15. The heat pump of claim 14, the cooling loop further including an auxiliary heat exchanger to reject heat from the working fluid in the fifth state from the recuperating heat exchanger to the ambient environment.

16. The heat pump of claim 13, wherein the counterflow heat exchanger includes two single-stage heat exchangers or a single heat exchanger with an intermediate manifold.

17. A method for cycling a heat pump in a closed fluid loop, the method comprising:
compressing a working fluid in a first state to raise the temperature and pressure to a second state;
cooling the working fluid in the second state in a counterflow heat exchanger, including:
cooling the working fluid in the second state in a first stage to a third state; and
cooling a first portion of the working fluid in the third state in a second stage to a fourth state;
expanding the working fluid in a fifth state to a sixth state;
heating the working fluid in the sixth state to a seventh state;
expanding a second portion of the working fluid in the third state to an eighth state;
mixing the working fluid in the seventh state with the working fluid in the eighth state; and
heating the mixture of the working fluid in the seventh and eighth states to the first state while cooling the working fluid in the fourth state to the fifth state in a recuperating heat exchanger.

18. The method of claim 17, wherein the first stage is a first heat exchanger and the second stage is a second heat exchanger.

19. The method of claim 17, wherein the first stage and the second stage comprise portions of a single heat exchanger with an intermediate manifold.

20. The method of claim 17, further comprising further cooling the working fluid in the fifth state by rejecting heat to the ambient atmosphere before expanding the working fluid in the fifth state to the sixth state.

\* \* \* \* \*

UNITED STATES PATENT AND TRADEMARK OFFICE
CERTIFICATE OF CORRECTION

| | |
|---|---|
| PATENT NO. | : 11,435,120 B2 |
| APPLICATION NO. | : 16/867447 |
| DATED | : September 6, 2022 |
| INVENTOR(S) | : Timothy J. Held and Jason D. Miller |

It is certified that error appears in the above-identified patent and that said Letters Patent is hereby corrected as shown below:

On the Title Page

Item [73] please correct from:
ECHOGEN POWER SYSTEMS (DELAWRE), INC.
To:
ECHOGEN POWER SYSTEMS (DELAWARE), INC.

Signed and Sealed this
Twenty-first Day of March, 2023

Katherine Kelly Vidal
*Director of the United States Patent and Trademark Office*